United States Patent Office 2,808,360
Patented Oct. 1, 1957

2,808,360

COMPOSITIONS FOR COMBATTING COUGH

Gino Carrara, Milan, Italy, assignor to Lepetit S. p. A., Milan, Italy

No Drawing. Application February 7, 1955, Serial No. 486,718

Claims priority, application Italy October 8, 1952

11 Claims. (Cl. 167—65)

The present invention relates to compositions useful for combatting cough.

More particularly, the present invention relates to therapeutical compositions in which the active ingredient for combatting cough is 1-nicotinyl-2-cyclohexylidenehydrazine

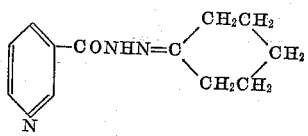

either alone or associated with other therapeutical substances.

This application is a continuation-in-part of my co-pending application Serial No. 383,120 filed on September 29, 1953, and now abandoned.

It is known that cough can be caused by a number of diseases, and only seldom may it be considered as a primary disease. Its origin can be rhinopharyngeal, laryngothracheal, bronchial, pulmonary, pleural, mediastinal, cardio-aoraic, gastric, hepatic, intestinal, according to the region in which the primary disease is located. In every case, however, the casual therapy of the primary disease is facilitated if it is associated with a symptomatic therapy of the cough, since persistent and difficult cough can considerably worsen the general conditions of the patient. To this end, drugs are administered which reduce the excitability of bulbar centers.

I have now found that 1-nicotinyl-2-cyclohexylidene-hydrazine is highly active in causing substantial symptomatic relief of cough by the daily administration of 0.2–1 g. of 1-nicotinyl-2-cyclohexylidenehydrazine for a period ranging from 5 to 30 days according to the nature of the primary disease.

Since the acute and chronic toxicity of 1-nicotinyl-2-cyclohexylidenehydrazine has been found to be very low, its therapeutical administration is practically without important side effects and can be continued, if necessary, for a longer period than is indicated above and with higher doses. It is administered mixed with a pharmaceutical carrier, the mixture containing from 1 to 95% of the drug, and preferably from 10 to about 500 mg. per dosage unit.

As I have pointed out above, one object of my invention is to provide 1-nicotinyl-2-cyclohexylidenehydrazine for use in combatting cough. For this purpose, according to my invention, 1-nicotinyl-2-cyclohexylidenehydrazine may be associated with a solid carrier and take the form of tablets, powders, causules and other dosage forms which are particularly useful for oral ingestion. These dosage forms may be prepared by admixing 1-nicotinyl-2-cyclohexylidenehydrazine with a solid diluent and a tabletting adjuvant, as for instance stearic acid, magnesium stearate, starch, lactose, talc and/or other substances, provided all these substances do not show any incompatibility with 1-nicotinyl-2-cyclohexylidenehydrazine. Alternatively, 1-nicotinyl-2-cyclohexylidenehydrazine may be admixed with other substances therapeutically active in combatting the primary cause of cough.

The compound with which the present invention is concerned, i. e. 1-nicotinyl-2-cyclohexylidenehydrazine can be prepared as described in my co-pending application Serial No. 383,120, filed Sept 29, 1953, by dissolving nicotinylhydrazide in water and adding cyclohexanone to the resulting solution. The white product which precipitates is collected and dried. It has a M. P. of 112° C.

Example No. 1

| | Grams |
|---|---|
| 1-nicotinyl-2-cyclohexylidenehydrazine | 0.2 |
| Cornstarch | 0.044 |
| Lactose | 0.241 |
| Magnesium stearate | 0.015 |

The four substances are thoroughly mixed and tableted to form one tablet of 0.5 g.

Example No. 2

| | Grams |
|---|---|
| 1-nicotinyl-2-cyclohexylidenehydrazine | 0.2 |
| Cornstarch | 0.023 |
| Lactose | 0.2 |
| Talc | 0.044 |
| Stearic acid | 0.033 |

The four substances are thoroughly mixed and tableted to form one tablet of 0.5 g.

In the course of a therapeutical experimentation on ambulatory patients suffering from chronic pharyngitis with cough, all smokers with very dense catarrh, a prompt and marked relief was observed.

The treatment with 1-isonicotinyl-2-cyclohexylidenehydrazine was carried for two weeks with doses of 200 mg. daily (one tablet) for the first week and of 400–600 mg. daily (2–3 tablets) for the second week.

In a group of eleven patients, for example, only one presented no improvement after the treatment. In eight patients cough and expectoration subsided totally. In the other two the treatment caused at first a diminution of the frequency of attacks and a fluidification of the expectoration; after eight days, the dose having been increased to 3 tablets, the improvement was definitive.

In the Disabled Workers Institute of Milan, 1-nicotinyl-2-cyclohexylidenehydrazine was administered to patients suffering from chromin bronchitis and bronchial asthma often associated with other severe pathological findings. The patients were treated according to the following schema and with the following beneficial results:

1. G. M., aged 74, male. Mycocardiosclerosis, chronic bronchitis. The patient has a history of recurrent bronchial diseases for over two years. He has been treated with balsamics by parental route and with antibiotics by aerosol, without obtaining any improvement. He complained of stubborn cough particularly increasing during the night, scarce mucopurulent excretum and light dyspnea. After 3 days' therapy with 3 tablets 1-nicotinyl-2-cyclohexylidenehydrazine daily the patient noted a remarkable increase in expectoration and gradual decrease of excretum; the cough subsided almost completely.

2. M. V., aged 73, male. Pulmonary emphysema, chronic bronchitis and myocardiosclerosis. The patient has been affected by chronic bronchitis for about 5 years; he complained of crises of dyspnea, stubborn cough with moderate serous excretum, widespread pains of the thorax. After administration of three tablets daily of 1-nicotinyl-2-cyclohexylidenehydrazine for 15 days, the syndrome was remarkably improved: very scarce cough, expectoration absent.

3. L. G., aged 65, male. Asthmatic chronic bronchitis. The patient has been affected by bronchial asthma for 4 years; he has been hospitalized because the symptomatology has got worse: intense dyspnea, stubborn cough with abundant serious excretum. 1-nicotinyl-2-cyclohexylidenehydrazine was administered (3 tablets daily) for 12 days. The expectoration becomes easier starting from the 3rd day; cough remained intense up to the 8th day, when it began to decrease. On the 12th day the excretum was very scarce, and the cough was much less intense.

4. P. M., aged 74, male. Chronic bronchitis, premarantic status. The patient was hospitalized for organic exhaustion. He complained of insistent cough, particularly during the night abundant mucopurulent excretum. Three tablets daily of 1-nicotinyl-2-cyclohexylidenehydrazine were administered for ten days. At the end of treatment the cough almost disappeared, excretum was noticeably decreased in quantity.

5. R. G., aged 73, male. Asthmatic chronic bronchitis. The patient has been suffering from bronchial asthma since the age of 45. Presently he shows recurrent crises of bronchialasthma, dyspnea from effort, usually difficult expectoration, crises of spasmodic cough. He was treated with 3 tablets daily of 1-nicotinyl-2-cyclohexylidenehydrazine for 10 days. He showed a remarkable improvement since the 3rd day when the cough began to decrease. Dyspnea has also noticeably decreased. Excretum has increased during the first 24 hrs., but has slowly decreased until the 10th day when treatment was discontinued.

6. A. F., aged 82, male. Pulmonary emphysema, chronic bronchitis with mycocardiosclerosis. The patient has been affected by chronic bronchitis for over 10 years. On admittance he complained of cough with scarce excretum, intense dyspnea during the night. The treatment with 1-nicotinyl-2-cyclohexylidenehydrazine was started with 3 tablets a day and was kept up for 10 days. The improvement was remarkable starting from the fourth day and increased until the 10th day when cough almost disappeared and excretum was reduced to minimum quantities.

7. F. B., aged 51, male. Chronic bronchitis. The patient has been affected by chronic bronchitis since 5 years. He complained of temperature rising in the evening preceded by shivers, increase of cough and of excretum. 1-nicotinyl-2-cyclohexylidenehydrazine was administered (3 tablets daily) for 10 days. Mucopurulent expectoration increased up to the 5th day, then decreased to minimum quantities. Cough also subsides and almost disappears on the 10th day.

8. G. A., aged 78, male. Asthmatic chronic bronchitis; hypertensive myocardiosclerosis. The patient has been affected by bronchial asthma for 5 years; he complained of stubborn cough particularly during the night, moderate mucopurulent excretum, recurrent asthmatic attacks. Treatment with 1-nicotinyl-2-cyclohexylidenehydrazine was started, 3 tablets daily for 15 days. In the first days no substantial improvement was observed; afterwards expectoration became much easier, excretum increased in quantity. Cough subsided rapidly and after the 5th day excretum was progressively reduced to minimum quantities.

Fifteen cats were subjected to the method described by W. F. Perry and E. M. Boyd in J. Pharmacol. Exptl. Therap. 73, 65 (1941) for the measure of the output of respiratory tract fluid.

1-nicotinyl-2-cyclohexylidenehydrazine was administered to the fifteen cats by stomach tube suspended in saline in a dose of 5 mg. per kilo body weight. This dose increased the mean output of respiratory tract fluid by about 200%.

The acute oral toxicity in mice was determined according to the known procedures. The $LD_{50}$ was found to be 250 mg./kg.

In 10 rats, with doses of 5 g./kg. no deaths were observed after 96 hrs.

The chronic oral toxicity in rats was also determined. With doses of 100 and 200 mg./kg. daily for 40 days, no death was observed.

I claim:

1. A composition for combatting cough, comprising not less than 1 percent of 1-nicotinyl-2-cyclohexylidenehydrazine and a solid pharmaceutical carrier.

2. A composition for combatting cough, comprising not less than 10 mg. of 1-nicotinyl-2-cyclohexylidenehydrazine per dosage unit and a solid pharmaceutical carrier.

3. A composition in dosage unit form for combatting cough, comprising about 10 to about 500 mg. 1-nicotinyl-2-cyclohexylidenehydrazine and a solid pharmaceutical carrier.

4. A composition in dosage tablet unit form for combatting cough, comprising about 10 to about 500 mg. 1-nicotinyl-2-cyclohexylidenehydrazine per dosage unit and a solid pharmaceutical carrier.

5. A composition in dosage unit form for combatting cough, comprising not less than about 10 mg. of 1-nicotinyl-2-cyclohexylidenehydrazine and a solid pharmaceutical carrier, said composition being in tablet dosage unit form.

6. A composition according to claim 5, wherein the solid pharmaceutical carrier comprises at least one member selected from the group consisting of lactose, cornstarch, magnesium stearate and stearic acid.

7. A composition for combatting cough, comprising from about 1 percent to about 95 percent of 1-nicotinyl-2-cyclohexylidenehydrazine and a solid pharmaceutical carrier.

8. A composition in dosage unit form for combatting cough, comprising not less than 1 percent of 1-nicotinyl-2-cyclohexylidenehydrazine and a solid pharmaceutical carrier.

9. A composition for combatting coughs, comprising 1-nicotinyl-2-cyclohexylidenehydrazine mixed with a pharmaceutical carrier.

10. A composition for combatting coughs, comprising 1-nicotinyl-2-cyclohexylidenehydrazine mixed with a pharmaceutical carrier in such concentration that an administrable dose of the mixture contains from 10 to about 500 mg. of the 1-nicotinyl-2-cyclohexylidenehydrazine.

11. A composition for combatting coughs, comprising 1-nicotinyl-2-cyclohexylidenehydrazine mixed with a pharmaceutical carrier in such concentration that an administrable dose of the mixture contains about 200 to 500 mg. of the 1-nicotinyl-2-cyclohexylidenehydrazine.

References Cited in the file of this patent

UNITED STATES PATENTS 2,685,585    Fox ------------------ Aug. 3, 1954

OTHER REFERENCES

Robitzek: The Quarterly Bulletin of Sea View Hospital, vol. XIII, No. 1, Jan. 1952, pages 27–51, especially pp. 35–36.